United States Patent [19]
Shimada et al.

[11] 3,900,453
[45] Aug. 19, 1975

[54] PROCESS FOR THE PRODUCTION OF METHACRYLATE POLYMER MOLDING MATERIALS

[75] Inventors: Kazushi Shimada; Toru Maeda; Tamotu Nishizawa; Takehiko Narisada; Hisao Anzai, all of Otake; Yositaka Sasaki, Tokyo, all of Japan

[73] Assignee: Mitsubishi Rayon Co., Ltd., Tokyo, Japan

[22] Filed: Aug. 15, 1973

[21] Appl. No.: 388,554

[30] Foreign Application Priority Data
Aug. 15, 1972  Japan.............................. 47-81138
July 18, 1973  Japan.............................. 48-80306

[52] U.S. Cl.... 260/86.1 E; 260/31.8 R; 260/33.4 R; 260/42.52; 260/45.85 B; 260/89.5 A; 264/148
[51] Int. Cl........................... C08f 3/68; C08f 15/18
[58] Field of Search................... 260/89.5 A, 86.1 E

[56] References Cited
UNITED STATES PATENTS
3,234,303  2/1966  Bild et al. ...................... 260/89.5 A
3,637,545  1/1972  Fivel ............................. 260/89.5 A

*Primary Examiner*—Harry Wong, Jr.
*Attorney, Agent, or Firm*—Armstrong, Nikaido & Wegner

[57] ABSTRACT

Continuous process for producing methacrylate polymer molding materials by bulk polymerization, in which the polymerization is carried out in the presence of a mercaptan and a controlled catalytic amount of a free radical initiator, while controlling conversion depending on a polymerization temperature. The reaction mixture is directly, or after having been subjected to further polymerization, continuously devolatilized. The process can be operated stably for a prolonged period of time to produce a uniform product having desirable properties as a molding material, especially an improved moldability.

7 Claims, 3 Drawing Figures

PROCESS FOR THE PRODUCTION OF METHACRYLATE POLYMER MOLDING MATERIALS

BACKGROUND OF THE INVENTION

The invention relates to a process for the production of methacrylate polymer molding materials. More particularly, it relates to a continuous process comprising bulk polymerization of monomers mainly composed of methyl methacrylate and subsequent removal of unreacted monomers from the polymerization product.

Methacrylate polymer molding materials obtainable by a process in accordance with the invention usually have a flow rate (an extruded polymer in grams per 10 min, at a barrel temperature of 230°C, under a load of 10 kg, hereinafter referred to as "FR") of 0.5 to 75, especially 3 to 75 g/10 min, as measured in accordance with ASTM D 1238-65T.

Shaped articles of methacrylate polymers are widely used in view of their excellent transparency, weatherability, mechanical strength, resistance to heat and chemicals, and other beneficial properties. Molding materials useful for shaping such articles must have a good moldability. When the polymeric molding materials are re-heated to a molten state in order to be shaped or molded, the molten polymer should desirably have a high fluidity. However, molding materials which have a high fluidity often result in shaped articles of poor heat-resistance and unsatisfactory mechanical properties. Thus, in order to obtain shaped articles of acceptable heat resistance and mechanical properties, a fluidity of the polymer at the time of being molded has necessarily been sacrificed to some extent. Severe molding conditions, such as an excessively high molding temperature as in the molding of less fluid materials or prolonged molding periods as in the molding of fairly fluid materials into large articles, affect the quality of the resultant products. For example, injection molding under unduly severe conditions often yields products having the so-called "silver streak" defect, or products which are foamed or discolored.

Industrial production of methacrylate polymer molding materials has commonly been practiced by batchwise suspension polymerization. Although polymerization via suspension polymerization is easy to control because of the use of water as a polymerization medium, it suffers from several disadvantages as noted below. A dispersing agent and other auxiliary chemicals employed during the suspension polymerization remain to some extent in the product polymer, and lower the quality thereof. A post treatment involving washing of the product with a quantity of water and subsequent drying is necessary, and such a post treatment and batchwise polymerization make the process less efficient and more troublesome. At the same time the cost of installations and operation for such post treatment necessarily increase the production cost. Furthermore, it is undesirable from the standpoint of pollution problems to release into the environment a large quantity of water employed as a polymerization medium or used for washing the product. It is polluted, having unreacted monomers and a dispersing agent and other auxiliary chemicals which adversely affect the environment. If such water is to be treated prior to releasing, costs for the treatment of the water make the process expensive. For these reasons, the currently practiced processes using suspension polymerization techniques are not necessarily advantageous.

Several processes for producing methacrylate polymer molding materials by bulk polymerization have also been proposed. These processes using bulk polymerization techniques do not suffer from the above disadvantages of suspension polymerization, since the use of dispersing agents and the post treatment required in suspension polymerization are not necessary. Furthermore, bulk polymerization may advantageously be carried out continuously. However, this process involves another serious problem. When a vinyl monomer, especially methyl methacrylate, is bulk polymerized, as the conversion increases, the reaction velocity may increase sharply and uncontrollably. This is the "gel effect," which is well known in the art. It is believed to be a phenomenon, wherein as conversion increases, the viscosity of the polymerization system abruptly increases thereby causing a decrease in the rate of the chain termination reaction. The other aspects of the radical polymerization reaction, such as initiation and chain growth, are relatively unaffected. As a consequence, the desired result of growing a polymer with active free radical sites is greatly enhanced thus leading to the sharp and uncontrollable increase in a reaction velocity. When bulk polymerization of methyl methacrylate is carried out batchwise or continuously in a reactor wherein the reaction mixture may be mixed in directions perpendicular to the axis of the reactors, but not substantially in a direction along the axis of the reactor (the latter type of continuous bulk polymerization herein referred to as "plug-flow type bulk polymerization") a peak is frequently observed in a rate of evolution of reaction heat, presumably due the gel effect. In bulk polymerization of such types (i.e. batchwise or plug-flow type bulk polymerization), since the monomer feed cannot be utilized for cooling the reaction mixture, it is not easy to remove the heat of reaction rapidly accumulated in the reaction mixture within a reasonably short period of time. Even if a complete removal of heat of reaction may be achieved by some means and the polymerization temperature kept constant, the increase in conversion and the reduction in the chain termination reaction are accompanied by formation of a polymer of higher polymerization degrees, thus resulting in a wider distribution of polymerization degree, which is not desirable for quality of the product. If, however, the removal of heat of reaction is insufficient, the polymerization proceeds uncontrollably. Accordingly, the known processes using batchwise or plug-flow type bulk polymerization techniques are intended to be carried out either under conditions which may avoid the occurrence of the gel effect and the rapid increase in reaction velocity, as described in U.S. Pat. No. 3,234,303, or in a manner as described by Arthur V. Tabolsky in JACS. Nov. 20, 1958 and in British Pat. No. 937,215. The latter method is known as "dead end polymerization," in which a radical initiator in the system is exhausted prior to the completion of the polymerization.

Besides the above discussed bulk polymerization techniques, continuous processes for the production of methacrylate polymers by bulk polymerization wherein the reaction mixture is thoroughly stirred in a reactor have also been proposed. The bulk polymerization of this type may be referred to as that of complete mixing type. But the known processes of this type require a large reaction volume, in order to obtain a reasonably high conversion, when compared with the plug-flow type bulk polymerization, and cannot realize the so-called dead end polymerization since an amount of a radical initiator is continuously fed to the reaction mixture. For these reasons and others the known processes using complete mixing type bulk polymerization techniques, as described in U.S. Pat. No. 3,474,081, are limited to the production of syrups of relatively low conversion known as a prepolymer.

Accordingly, it is an object of the invention to provide a process for producing methacrylate polymer molding materials of good quality, especially those having an improved moldability or a wide range of temperatures at which they are capable of being molded.

Another object of the invention is to provide an industrially advantageous process for producing such molding materials.

It is a further object of the invention to provide such a process which is capable of being readily controlled to stably produce products having substantially constant properties.

Other objects and advantages of the invention will be apparent to those skilled in the art from the following description and the appended claims.

SUMMARY OF THE INVENTION

In accordance with the invention, there is provided a process for the production of methacrylate resin molding materials comprising a methacrylate polymer containing at least 80% by weight of methyl methacrylate units, and, up to 20% by weight of units derived from at least one selected from alkyl acrylates and alkylmethacrylate other than methyl methacrylate by continuous bulk polymerization in a polymerization reactor and subsequent removal of volatile contents, mainly composed of the remaining unreacted monomer in a devolatilizor. The process is characterized in that a monomer feed, containing 0.01 to 1.0% by mole of a mercaptan, and free radical initiator in such a concentration that A, which is a concentration of the free radical initiator in the monomer feed in terms of number of moles of the initiator present in 100 g of the monomer feed, and B, which is a half life in hour of the free radical initiator at a polymerization temperature, satisfy the following relations:

$$10 \geq A^{1/2} \cdot B^{-1/2} \times 10^3, 3 \geq A \cdot B \times 10^5,$$

is continuously fed to a polymerization zone, a reaction mixture in said polymerization zone being thoroughly stirred and kept at a temperature of above 130°C and below 160°C, while maintaining a polymer content $\phi$ (in % by weight) in said reaction mixture substantially constant and so as to satisfy the following relation:

$$50 < \phi < 70 \exp(0.0121T - 1.81)$$

wherein T represents the polymerization temperature in °C, thereby effecting polymerization, continuously withdrawing the reaction mixture from the polymerization zone and finally continuously removing volatile contents mainly composed of unreacted monomers.

DETAILED DESCRIPTION OF THE INVENTION

Methacrylate polymer molding materials which are obtained by the process of the invention comprise either a homopolymer of methyl methacrylate or a copolymer containing at least 80% by weight of methyl methacrylate units and up to 20% by weight of units derived from at least one alkyl acrylate and alkyl methacrylate other than methyl methacrylate. Such homopolymer and copolymer may be referred to as "methacrylate polymer(s)". The alkyl acrylates which may be employed to copolymerize with methyl methacrylate may be selected from alkyl acrylates having 1 to 18 carbon atoms in the alkyl moiety, and include, for example, methyl, ethyl, n-propyl, n-butyl, 2-ethylhexyl, dodecyl and stearyl acrylates. The alkyl methacrylates which may be employed to copolymerize with methyl methacrylate may be selected from alkyl methacrylates having 2 to 18 carbon atoms in the alkyl moiety, and include for example, alkyl methacrylates having any of the alkyls, other than methyl, given as examples above with respect to the suitable alkyl acrylates. Among others, we prefer a homopolymer, i.e. polymethyl methacrylate and copolymers of methyl methacrylate with an alkyl acrylate selected from methyl, ethyl and butyl acrylates. Since methyl methacrylate has a polymerization activity different from those of the other alkyl methacrylates and the alkyl acrylates, when a copolymer having a predetermined composition is to be produced, a composition of a monomer feed should appropriately be selected and maintained so that a product of the desired composition may be produced, depending on relative activities of the comonomers to be employed. For example, when methyl methacrylate is copolymerized with methyl acrylate or ethyl acrylate, the composition of the monomer feed should be at least approximately 70% by weight of methyl methacrylate and up to approximately 30% by weight of methyl acrylate or ethyl acrylate.

The process of the present invention comprises two steps which are a polymerization step and a volatile removing step. In the polymerization step, the monomer feed containing methyl methacrylate is subjected to continuous bulk polymerization in one reactor or in two or more reactors in series, with the preference to the use of one single reactor, while in the volatile removing step, volatile contents mainly composed of unreacted monomers are removed and optionally suitable additives may be added to obtain a molding material having the desired properties.

In the polymerization step, a methyl methacrylate monomer feed (which may contain one or more comonomers) containing 0.01 to 0.1% by mole of a mercaptan, and a hereinabove defined amount of a free radical initiator is continuously fed to a polymerization zone.

Illustrative of suitable mercaptans which may be added to a monomer feed in a process of the invention one can mention those having 3 to 18 carbon atoms; for example, primary aliphatic mercaptans such as n-butyl, isobutyl, n-octyl, n-dodecyl mercaptans and the like; secondary aliphatic mercaptans such as sec-butyl, sec.-dodecyl mercaptans and the like; tertiary aliphatic mercaptans such as tert.-butyl mercaptan, and the like; aromatic mercaptans such as phenyl mercaptan, thicresol, 4-tert.-butyl-o-thicresol and the like; ethylenethioglycol; and thioglycolic acid and alkyl esters thereof. These may be employed alone or in combination. Of these, we have found that tert.-butyl, mercaptans n-butyl, n-octyl and n-dodecyl are preferred.

The mercaptans are employed in an amount of from 0.01 to 1.0% by mole based on the monomer feed. With less than 0.01% by mole, a polymerization velocity tends to increase abnormally and control of the reaction often becomes difficult. Consequently, it is difficult to obtain products having constant properties and excellent moldability. Whereas, with a substantial excess of mercaptan, a polymer of a reduced polymerization degree is produced, and final shaped articles made therefrom will have poor mechanical properties. Preferred amounts of the mercaptans depend on a particular mercaptan to be employed. For example, in case of n-dodecyl mercaptan, an amount of 0.1 to 0.2% by mole are preferred, and in case of tert.-butyl mercaptan 0.2 to 0.45% by mole.

It is to be understood that the free radical initiator to be used in accordance with the invention is one which satisfies the parameters of the above discussed equations as to half-life. As a practical matter, it has been found that free radical initiators having a half-life at the reaction temperature of at least 0.01 hour, and more preferably at least 0.035 hour, should be used in the process of the invention. As examples of such free radical initiators may be mentioned organic peroxides such as di-tert.-butyl peroxide, di-cumyl peroxide, methyl ethyl ketone peroxide, di-tert.-butyl di-perphthalate, di-tert.-butyl perbenzoate, tert.-butyl peracetate, 2,5-dimethyl-2,5-di(tert.-butyl peroxy)hexane, di-tert.-amyl peroxide, 2,5-dimethyl-2,5-di(tert.-butyl peroxy)-hexyne, and azo compounds such as azobisisobutanol diacetate, 1,1-azobiscyclohexane carbonitrile, 2-phenylazo-2,4-dimethyl-4-methoxy-valeronitrile, 2-cyano-2-propylazoformaldehyde and the like. These free radical initiators may be employed alone or in combination, although it is preferred to use a single initiator since control of the polymerization is complicated with two or more initiators. Of these initiators, di-tert.-butyl peroxide is the most preferred.

An amount of the free radical initiator contained in the monomer feed should be controlled in such a manner that A, which is a concentration of the free radical initiator in the monomer feed in terms of number of moles of the initiator present in 100 g of the monomer feed, and B, which is a half life in hour of the free radical initiator at a polymerization temperature, satisfy the following relations:

$$10 \geq A^{1/2} \cdot B^{-1/2} \times 10^3 \quad (1)$$

and $$3 \geq A \cdot B \times 10^5 \quad (2)$$

We have found that when a value of $A^{1/2} \cdot B^{-1/2} \times 10^3$ exceeds 10 a moldability of the product tends to become poorer. This value should be not more than 10 and is preferably not more than 6. We have also found that if a value of $A \cdot B \times 10^5$ is greater than 3 undesirable adhesion of polymer to the employed apparatus will occur. We prefer to select a suitable initiator and its concentration in the monomer feed to make this value not more than 2.5.

Preferably, A and B should further satisfy the following relation:

$$2.9 \geq A^{-1}(B + 10.3) \times 10^{-6} \quad (3)$$

We have found that as a value of $A^{-1}(B + 10.3) \times 10^{-6}$ exceeds 2.9, by products, particularly oligomers end to be produced. When the presence of oligomers in the molding material is not desired this value should be kept not more than 2.9 and preferably not more than 2.0.

As described, we employ a limited class of initiators having a relatively long half-life. A particular concentration of the initiator in the monomer feed depends on the particular initiator and the particular polymerization temperature. It should be noted, however, that the concentration of the initiator employed in accordance with the invention is extremely low, when compared with the levels at which the same initiator has been employed in prior art processes.

A preferred range of a concentration of initiator employed in a process of the invention and defined by these relations (1), (2) and (3) is graphically shown in FIG. 1 of the attached drawing. In FIG. 1, the curves (a), (b) and (c) correspond to the equations $$10 = A^{1/2} \cdot B^{-1/2} \times 10^3,$$

$$2.9 = A^{-1}(B + 10.3) \times 10^{-6},$$

and $$3 = A \cdot B \times 10^5,$$

respectively, each showing the critical concentration, defined by each of the relations, of initiator in the monomer feed (in number of moles of the initiator in 100 g of the monomer feed) as a function of a half life (in hour) of the initiator at the polymerization temperature. Thus, any point within the hatched area shown in FIG. 1 represents a possible combination of a concentration of initiator in the monomer feed and a half life of the initiator, which may be employed in the practice of the invention.

A concentration of the free radical initiator contained in the monomer feed is preferably controlled so as to satisfy the following conditions:

$$6 \geq A^{1/2} \cdot B^{-1/2} \times 10^3 \quad (1')$$

$$2 \geq A^{-1}(B + 10.3) \times 10^{-6} \quad (3')$$

and $$2.5 \geq A \cdot B \times 10^5 \quad (2')$$

By the term "a half life of the free radical initiator at a polymerization temperature" referred to herein, we mean a half life of the initiator in a diluted solution in benzene maintained at the same temperature as the polymerization temperature. This may readily be determined by procedures described in Modern Plastics, 1959, Feb., page 144. For example, di-tert.-butyl peroxide and di-cumyl peroxide have values of a half life of 1.0 and 0.23 in hours at 150°C, respectively.

In a polymerization zone, the reaction mixture which is being polymerized and to which the monomer feed is being continuously added at a selected constant rate should be thoroughly stirred and kept at a temperature of from above 130°C and below 160°C. When a temperature of the reaction mixture (hereinafter referred to as "a polymerization temperature") is substantially lower than 130°C, it becomes difficult to ensure uniform mixing and heat transfer due to high viscosity of the polymerizing reaction mixture and, in consequence, it is difficult to control the polymerization and to raise the conversion. As a polymerization temperature is raised, the reaction mixture will have an increased fluidity, but tendencies to formation of oligomers and to reduction in heat resistance and moldability of the product will appear. For these reasons a polymerization temperature is selected within the range between 130° and 160°C, and preferably from 140° to 160°C.

Since heat is created in the reacting mixture by the exothermal reaction and the action of vigorous stirring, the reaction mixture should be kept at a predetermined temperature by heat removal. This temperature control by heat removal may be carried out by any of known techniques, including heat removal by heat transfer from cooled surfaces in the polymerization vessel by means of a jacket, draft tubes, cooling tubes and the like; or by supplying a cooled monomer feed, or by other heat removal systems such as reflux cooling.

In the polymerization zone, a polymer content $\phi$ of the reaction mixture (or herein referred merely as a conversion) is maintained, depending on the polymerization temperature, to satisfy the following relation:

$$50 < \phi < 70 \exp(0.0121T - 1.81) \quad (4)$$

wherein T represents the polymerization temperature in °C, and is kept substantially constant.

The invention is based on a discovery that in continuous bulk polymerization of complete mixing type for producing methacrylate polymers, when a conversion is maintained relatively high as defined by the relation (4), this high conversion requirement makes it possible, together with the limited initiating activity requirement as hereinabove defined the use of the minor but definite amount of a mercaptan and the specified polymerization temperature, to advantageously utilize a rapid increase in a reaction velocity due to the so-called gel effect without suffering from uncontrollable progress of the polymerization. A process in accordance with the invention can readily be controlled so as to stably produce the product having substantially constant properties for a prolonged period of operation, and during the polymerization no peak has been observed in a rate of evolution of heat of reaction. It has also been found that a reasonably high yield of the polymer per unit volume of the reactor can be obtained with minimum formation of by products and without any appreciable adhesion or deposit of polymer to parts of the reactor. Furthermore, the process can be carried out using a simple, and inexpensive apparatus which is commercially available.

We have found that if the conversion exceeds the critical value, $70 \exp(0.0121T - 1.81)$, defined by the relation (4), the required uniform mixing and heat transfer become difficult, whereas a conversion of 50% or less makes it difficult to fully utilize a rapid increase in reaction velocity due to gel effect and results in products containing unreacted monomers in a major proportion, which require an increased cost for volatilization. In general, it is preferred to maintain $\phi$ less than the upper critical value by the order of several per cent. Upper critical values are, for example, 55.3% at 130°C, 62.4% at 140°C, 70.3% at 150°C, and 79.6% at 160°C.

A reactor which may be employed in the practice of the invention may be of a closed type equipped with a jacket and a suitable stirrer for mixing high viscosity materials. The known type of polymerization apparatus monomer feed is introduced thereinto at one end and a polymerized mass is withdrawn from the other end, and wherein a reacting liquid is mixed in the apparatus in directions perpendicular to the axis of the apparatus, but not in a direction parallel to the axis of the apparatus is not suitable for use in the practice of the invention. Other unsuitable polymerization apparatus for the invention are an elongated reactor type, as described in U.S. Pat. No. 3,234,303, in which mixing is not performed well in both radial and axial directions; a tower type polymerization vessel, as described in U.S. Pat. No. 3,252,950 as for a moderate or high conversion reactor; a longitudinal polymerization apparatus as described in U.S. Pat. No. 2,727,884, and other tubular or pipe-like polymerization apparatus.

We prefer to carry out the polymerization in one single reactor and to pass the reaction mixture withdrawn therefrom directly to a devolatilization zone for removing volatile contents. But if desired, the reaction mixture withdrawn from a polymerization zone in which polymerization in accordance with the invention has been effected may be subjected to further polymerization conditions prior to the volatile removal step. In the volatile removal step, the liquid reaction mixture may generally be heated at temperatures of about 200° to about 290°C under a reduced pressure, whereby most parts of the volatile contents mainly composed of remaining unreacted monomers are removed therefrom. A remaining monomer content in the final product is usually 1% by weight or less, preferably 0.3% by weight or less. Unreacted monomer which has been separated may be recovered and re-used.

Apparatus which may be employed for the removal of volatiles are of a type generally called a vent-extruder, a devolatilizer or a volatile removing extruder. These include for example, those described in "Modern Plastics Encyclopaedia" Vol. 45 (Oct. 1968), Vol. 46 (Oct. 1969), published by McGraw-Hill Publishing Co.; U.S. Pat. Nos. 2,434,707, 2,836,851, 2,736,058, 2,753,595 and 2,774,105.

A polymer product from which volatile contents have been removed may be extruded in a molten state through an appropriate die to be formed into desired shapes depending on the intended use, such as pellets, flakes, crushed materials, pipes, tubes, rods, sheet and so on.

To improve or modify certain properties of the molding material, the following materials may be incorporated thereto, alone or in combination: plasticizers or lubricants, such as di-octyl phthalate, di-octyl sebacate, stearyl alcohol, stearic acid, and lauryl alcohol; ultra violet absorbers, such as "Tinuvin P" (supplied by Geigy A.G.) and methyl salicylate; coloring dyestuffs and pigments and titanium dioxide; as well as polymers such as polystyrene and synthetic rubbers. These may be incorporated in the polymerization or volatile removing steps, or after the volatile removing step. In most cases, it is preferred to incorporate these additives after the polymerization step.

Molding materials obtainable by a process in accordance with the invention are characterized by having excellent moldability. Wideness of a temperature range in which a resin is moldable provides a convenient measure for moldability of the resin. A lower limit ($T_1$) of this temperature range depends primarily on fluidity of the resin and may be lowered by varying an average polymerization degree, amounts of employed comonomers and incorporated plasticizers. There is, however, a practical limit in reducing a lower limit of the moldable temperature range since it results in concurrent reduction of heat resistance mechanical properties, weatherability, steam resistance and solvent resistance of final molded articles. On the other hand the upper limit of the moldable temperature range will depend on resistance of the resin against decomposition by heat and volatile contents of the resin. To enhance such resistance against decomposition by heat, it is believed that techniques such as addition or mercaptans to a monomer feed and copolymerization with alkyl acrylates have been employed but results are not necessarily satisfactory.

The problem still unsolved has been to provide polymers having enhanced resistance against decomposition by heat and minimum volatile contents which will realize a satisfactorily high upper limit of the moldable temperature range, since a lower limit of this range may readily be lowered, as mentioned above, by controlling factors, such as a polymerization degree, amounts of comonomers and incorporated plasticizers, although there is a practical limit in doing so. By a process in accordance with the invention, molding materials having enhanced resistance against decomposition by heat and thus having a high upper limit of said temperature range are obtained. Having a wider moldable temperatures, the molding materials obtained by a process in accordance with the invention, when molded, result less frequently in faulty molded articles. This is an increase in yield and productivity. Furthermore, simultaneous molding of articles of relatively large and small volumes may also be performed satisfactorily, from the molding materials of the invention.

The invention will be further illustrated with reference to FIGS. 2 and 3 of the attached drawing.

FIG. 2 is a diagrammatic view of apparatus which may be employed in the practice of the invention, FIG. 3 is a diagrammatic view of another apparatus which may be used in practicing a process according to the invention.

With reference to FIG. 2, a monomer feed is passed from a tank 1 through a valve 2 and a line 3, and fed to a heat-exchanger 6 via a line 5 by means of a pump 4. The monomer feed which has been conditioned in the heat-exchanger 6 is then fed to a reactor 8 at its inlet 7. The reactor is equipped with a stirrer 11 of a type of spiral ribbons and a jacket 12 through which a cooling medium is caused to flow from an inlet 14 to an outlet 13 so as to maintain a reaction mixture in the reactor at a predetermined temperature. The reaction mixture is discharged from the reactor through a line 15 and passed by means of a pump 52 through a line 37 to a devolatilizor 40 provided with a screw 41, a vent 43, a die 44, heating means 42 and a system 53 for adding additives. A polymer separated from the volatiles is extruded by means of the screw through the die in the form of strands. The volatiles, which are mainly composed of unreacted monomers, are separated from the polymer by applying a reduced pressure through the vent, and recovered.

With reference to FIG. 3, a monomer feed is passed from a tank 1 through a valve 2 and a line 3, and fed to a heat-exchanger 6 via a line 5 by means of a pump 4. The heat-exchanger 6 is of a closed vessel type fitted with a coiled cooling jacket and a turbine stirrer. The monomer feed which has been conditioned in the heat-exchanger 6 flows into a first polymerization vessel 8 at the top thereof. The first vessel 8 is equipped with a stirrer 11 of a type of spiral ribbons and a jacket 12 through which a cooling medium is caused to flow from an inlet 14 to an outlet 13. A reaction mixture in the vessel 8 is discharged through a line 15 and passed to a second polymerization vessel 21 via a pump 52, a line 19, a heat-exchanger 45 and a line 20. The heat-exchanger 45 is a type known as a "Votator" illustrated in "Chemical Engineers' Handbook," page 1213, published by McGraw-Hill Book Co. in 1950, in which the reaction mixture is adjusted to a predetermined temperature. The second polymerization vessel 21 is provided with a stirrer 22 similar to that of the first polymerization vessel 8 and a cooling jacket 23 having coils (not shown). A reaction mixture discharged from the second polymerization vessel 21 is passed through a line 24, a pump 64 and line 39 to an extruder 40 for removing volatiles, separated from the volatiles in the extruder 40 and extruded through a die 44. The extruder 40 is provided with a screw 41, a vent 43, means for heating or cooling 42 and a system 53 for pouring additives.

In the above illustrative operation, valves 16, 48 and 54 are opened while valves 17, 47, 55 and 60 are closed. Whereas if the valves 16, 48, 55 and 60 are closed and the valves 17, 47 and 54 are opened, the reaction mixture from the first polymerization vessel 8 may directly be introduced to the extruder 40 for removing volatiles. Alternatively, by closing the valves 17 and 47 while opening the valves 16, 48, 55, 63 and 60 the reaction mixture from the second polymerization vessel 21 may be passed through a third polymerization vessel 56 and then introduced to the extruder 40. The third polymerization vessel 56 is also provided with a stirrer 62 of a type of double spirals and with a cooling jacket 61.

The invention will be further specifically described by the following illustrative, but not limitative, examples in which all percentages and parts are by weight unless otherwise specified. In each Example a process was carried out using a system as shown in FIG. 2. Specification of the employed apparatus were as follows: a polymerization reactor having an inner volume of 300$l$ ; an extruder as a devolatilizor having a twin-screw (90 mm$\phi$ × 2, 1200 mm long) with a vent portion of 600 mm in length. Unless otherwise specified, 0.1% by weight, based on the weight of the polymer, of stearyl alcohol was incorporated into the product.

Heat distortion temperature of the article shaped from the product polymer was determined in accordance with ASTM D-648-56 (Reapproved 1961), with a fiber stress of 264 psi and a rate of heating of 3.6°F/min. Moldability of the product polymer was estimated as follows: a given product polymer was injection molded under the following conditions:

| | |
|---|---|
| Injection molding machine employed | Supplied by Meiki Seisakusho H-35A, plunger type |
| volume of a mold | 130 mm × 130 mm × 2 mm, 2 molds |
| Injection pressure | 1,200 kg/cm$^2$ |
| Time taken to fill the molds | 4 sec/stroke |
| Cycle | 65 seconds |

A series of runs were carried out with varying barrel temperatures. The maximum barrel temperature $T_2$ at which % occurrence of undesired molded articles having visible defects often called "silver streak" is not greater than 20% was determined.

EXAMPLE 1

A monomer feed essentially consisting of 87 parts of methyl methacrylate, 13 parts of methyl acrylate, 0.23 part of n-octyl mercaptan and 0.0017 part (i.e. 0.113 × $10^{-4}$ mol of the initiator/100 g of the monomer feed) of di-tert.-butyl peroxide (having a half life of 1 hour at 150°C) was prepared while being prevented from contacting with air, conditioned to a temperature of 30°C in a heat-exchanger and continuously fed to a reactor at a rate of 15 l/hr. An internal pressure of the reactor was set to 8 kg/cm² gauge by nitrogen. A polymerization temperature was set to 150°C. After 7.8 hours, a flow rate of feed was raised to 25 l/hr, and a steady operation was started. In the reactor the reaction mixture was thoroughly mixed by means of a spiral ribbon stirrer rotated at a rate of 90 rpm. At a steady state, a residence time in the reactor was 4.7 hours, and the reaction mixture immediately after leaving the reactor contained 64% by weight of polymer determined by a gas chromatography techinque. Temperatures of a vent portion, an extruding portion and a die of the employed vent extruder were 250°, 230° and 225°C, respectively. A pressure at the vent portion was kept about 9 mmHg abs. The polymer was extruded in the form of strands through a die provided with 4 circular openings having a diameter of one-eighth inch, cooled by water and cut to pellets of one-fourth inch in length. At the end of 168 hours continued operation at a steady state 2.5 tons of molding pellets were obtained.

The molding material so obtained had an FR value of 36 to 40 and the percent of residual of methyl methacrylate and methyl acrylate, as measured by gas chromatography, was less than 0.1% each. It was a general purpose methacrylate polymer molding material of good quality, as revealed by having an extremely high $T_2$ of 295° to 300°C, a heat distortion temperature of 85°C as well as satisfactory mechanical properties and high transparency. After the continued operation any appreciable adhesion of polymer to parts of the employed apparatus was not observed.

EXAMPLE 2

Following the general procedure described in Example 1, a monomer feed essentially consisting of 98 parts of methyl methacrylate, 2 parts of methyl acrylate, 0.29 part of tert.butyl mercaptan and 0.0017 part (i.e. 0.116 × $10^{-4}$ mol of the initiator/100 g of the monomer feed) of di-tert.-butyl peroxide (a half life of which is 155°C was 0.55 hour) was processed except that a polymerization temperature of 155°C, a residence time of 4.1 hours and a conversion of 65% were employed. Temperatures of a vent portion, an extruding portion and a die of the vent extruder were 260°, 240° and 235°C. At the end of 240 hours continued operation at a steady state 3.6 tons of molding pellets were obtained.

The molding material so obtained had an FR value of 7 to 8, residual monomer of less than 0.1%, $T_2$ of 297° to 303°C and a heat distortion temperature of 103°C. Any appreciable adhesion of polymer to parts of the employed apparatus was not observed after the continued operation.

In view of the fact that the methacrylate polymer generally begins to decompose rapidly at temperatures of about 310° to 340°C, it will be appreciated from the data herein given, with respect to $T_2$, that polymeric molding materials obtained by a process in accordance with the invention have unusually high resistance against decomposition by heat. For a comparative purpose, various methacrylate polymer molding materials commercially available as heat-resistant types and as general purpose types were tested for $T_2$. The results are shown in Table I below.

Table I

| Supplied by | Heat-resistant type $T_2$ (°C) | General purpose type $T_2$ (°C) |
|---|---|---|
| A | 280 | 275 |
| B | 285 | — |
| C | 260 | — |
| D | 275 | — |
| E | 270 | 270 |
| F | 280 | 260 |
| G | 275 | 275 |

EXAMPLES 3–13

The general procedure described in Example 1 was repeated in each of these Examples with the variations indicated in Table II below. Properties of the product are also shown in the same Table. Any appreciable adhesion of polymer to the apparatus was not observed in any of the Examples.

The products obtained in Examples 1 through 7 had an average molecular weight of about 1,100, and those obtained in Examples 8 through 13 about 1,000.

Table II

| | Composition of Monomer Feed | | | | | | | | |
|---|---|---|---|---|---|---|---|---|---|
| | MMA | Comonomer | | | Initiator | | | Mercaptan | | Rate of feed |
| Example No. | (parts) | | (parts) | | Half life (hr) | (parts) | *4 (D × $10^4$) | | (parts) | (l/hr) |
| 3 | 98 | MA | 2 | A[1] | 0.35 | 0.0020 | 0.074 | n-dodecyl | 0.27 | 25 |
| 4 | 100 | — | — | B[2] | 0.93 | 0.0022 | 0.076 | tert.-butyl | 0.25 | 25 |
| 5 | 88 | MA | 12 | C[3] | 1.0 | 0.0020 | 0.133 | tert.-butyl | 0.35 | 25 |
| 6 | 99 | EA | 1 | C | 1.0 | 0.0017 | 0.116 | tert.-butyl | 0.30 | 25 |
| 7 | 93.5 | MA | 6.5 | C | 1.0 | 0.0017 | 0.114 | n-octyl | 0.21 | 25 |
| 8 | 100 | — | — | C | 0.55 | 0.0014 | 0.095 | tert.-butyl | 0.28 | 25 |
| 9 | 93.5 | MA | 6.5 | C | 0.55 | 0.0019 | 0.128 | n-octyl | 0.20 | 25 |
| 10 | 100 | — | — | C | 0.55 | 0.0020 | 0.136 | tert.-butyl | 0.30 | 25 |
| 11 | 87 | MA | 13 | C | 0.55 | 0.0019 | 0.127 | tert.-butyl | 0.34 | 25 |
| 12 | 100 | — | 0 | C | 0.36 | 0.0009 | 0.061 | tert.-butyl | 0.27 | 25 |
| 13 | 86.5 | MA | 13.5 | C | 0.36 | 0.0017 | 0.113 | tert.-butyl | 0.32 | 25 |

Note: A[1]:dicumyl peroxide; B[2]:2,5-dimethyl-2,5-di-(tert.-butylperoxy)hexyne-3;
C[3]:di-tert.-butyl peroxide; D[4]:number of mols of initiator/100 g of monomer feed.

TABLE II—Continued

| | Polymerization conditions | | | Conditions in vent extruder | | | | Properties of molding material | | | |
|---|---|---|---|---|---|---|---|---|---|---|---|
| | | | | Vent portion | | Extruding portion tempera-ture (°C) | Die tempera-ture (°C) | | Heat distortion tempera-ture (°C) | | |
| Example No. | Tempera-ture (°C) | Residence time (hr) | Conver-sion (%) | Tempera-ture (°C) | Pressure (mmHg abs.) | | | Residual monomer (%) | | FR | $T_2$ (°C) |
| 3 | 145 | 3.4 | 56 | 255 | 9 | 235 | 230 | 0.1–0.05 | 98–102 | 7 – 8 | 295 – 300 |
| 4 | 150 | 3.5 | 60 | 260 | 9 | 240 | 235 | 0.1–0.05 | 100–105 | 6 – 7 | 295 – 300 |
| 5 | 150 | 4.3 | 66 | 250 | 9 | 230 | 225 | 0.1–0.05 | 84–87 | 30 – 35 | 295 – 300 |
| 6 | 150 | 4.2 | 60 | 260 | 9 | 240 | 235 | 0.1–0.05 | 99–102 | 7 – 9 | 297 – 301 |
| 7 | 150 | 4.7 | 62 | 255 | 9 | 235 | 230 | 0.1–0.05 | 94–96 | 10 – 13 | 295 – 300 |
| 8 | 155 | 4.8 | 65 | 260 | 9 | 240 | 235 | 0.1–0.05 | 101–106 | 6 – 8 | 296– 302 |
| 9 | 155 | 3.9 | 65 | 255 | 9 | 235 | 230 | 0.1–0.05 | 94–96 | 11 – 14 | 294 – 300 |
| 10 | 155 | 3.5 | 64 | 255 | 9 | 240 | 235 | 0.1–0.05 | 100–104 | 6 – 7 | 295 – 300 |
| 11 | 155 | 4.0 | 68 | 250 | 9 | 230 | 225 | 0.1–0.05 | 84–86 | 35 – 39 | 295 – 298 |
| 12 | 158 | 6.2 | 60 | 255 | 9 | 240 | 235 | 0.1–0.05 | 100–105 | 6 – 7 | 295 – 300 |
| 13 | 158 | 5.0 | 70 | 255 | 9 | 240 | 235 | 0.1–0.05 | 83–86 | 37 – 42 | 294 – 298 |

EXAMPLE 14

The process was carried out using apparatus as diagrammatically shown in FIG. 3.

The first and second polymerization vessels 8 and 21 were charged with 90 l and 40 l of a mixture essentially consisting of 98 parts of methyl methacrylate, 2 parts of methyl acrylate and 0.28 parts of tert.-butyl mercaptan, respectively. The initial charges in these vessels were heated under stirring to 150°C. An inner pressure of each of the vessels and the third vessel 56 was set to 8 kg/cm² gauge by nitrogen. A monomer mixture containing 0.002 part (i.e. 0.136 × $10^{-4}$ mol/100 g of the monomer) of di-tert.-butyl peroxide in addition to the same proportions, as in the initial charge, of methyl methacrylate, methyl acrylate and tert.-butyl mercaptan was conditioned to a temperature of 30°C in the heat-exchanger 6 and continuously fed to the first polymerization vessel 8 at a rate of 10 l/hr. while transferring liquids at the same rate from the first polymerization vessel 8 to the second polymerization vessel 21 and from the second polymerization vessel 21 to the third vessel 56, respectively. A jacket temperature of the third vessel 56 was maintained at 150°C. The reaction mixtures in the first and second vessels were sampled under pressure, quenched and analyzed for polymer content by conventional gas chromatography techniques. When the reaction mixtures in the first vessel had reached a polymer content of 50% a rate of flow in each line was raised to 23 l/hr. At the same time, the valve 54 was opened, the valve 55 closed and the reaction mixture supplied through the line 39 to the extruder 40 in which the removal of volatiles was commenced. Temperatures of a vent portion, an extruding and blending portion and a die were 275°, 260°, and 255°C, respectively. A pressure at the vent portion was kept about 15 mmHg abs. A viscous resin was extruded in the form of strands through a die provided with 4 circular openings having a diameter of one-eighth inch. A rate of extrusion was 15.5 kg of polymer per hour. The extruded strands were cooled by water and cut to pellets of a length of one-fourth. At a steady state, the reaction mixture in the first and second polymerization vessels were maintained to have a conversion and a temperature of 53%, 150°C and 70%, 155°C, respectively, and to be under a pressure of 8 kg/cm² gauge. Residence times in the first and second vessels were 3.8 and 1.7 hours, respectively. At the end of 480 hours continued operation, about 6 tons of resins were obtained. During the whole period of operation, the process had worked stably.

The polymer so obtained had an FR value of 5.5 to 6.5, and the percent of residual of methyl methacrylate, as measured by gas chromatography, was 0.2 to 0.1%. It had an excellent moldability, revealed by having an extremely high $T_2$ of 295° to 300°C, as determined by the above-mentioned injection molding test. It had an average polymerization degree of about 1,000, a heat distortion temperature of 100°–203°C, satisfactory mechanical properties and high transparency, and was completely free from discoloration. All these prove that the product polymer has a desirable combination of properties as a methacrylate resin molding material for general purposes.

Incidentally, over a certain period during the course of continuous operation the valves 60 and 63 had been opened, whereby the initial discharge accumulated in the vessel 56 had been passed by the pump 54 through the line 59 to the line 39 at a rate by 0.5 l/hr. Appreciable effects on the polymer qualities was not observed by doing so. The heat-exchanger 45 was not employed for a purpose of cooling, but operated with an inner temperature kept 150°C.

EXAMPLE 15

Following the general procedure described in Example 14, a monomer feed essentially consisting of 100 parts of methyl methacrylate, 0.30 part of tert.-butyl mercaptan and 0.0017 part (i.e. 0.116 × $10^{-4}$ mole/100 g of the monomer) of di-tert.-butyl peroxide was continuously polymerized except that the reaction mixtures in the first and second polymerization vessels were maintained to have a conversion of 52% and 68%, respectively. Residence times in these vessels were 5.5 and 2.0 hours, respectively. The devolatized polymer was extruded at a rate of 15.0 kg/hr.

The polymer so obtained had an FR value of 5.5 to 6.0, $T_2$ of 295° to 299°C, a heat distortion temperature of 101 to 104°C and an average polymerization degree of about 1,000, and the percent of residual of methyl methcorylate was 0.2 to 0.1%.

EXAMPLES 16–18

In each of these examples, polymerization and subsequent devolatilization were carried out using an apparatus as employed in Example 14 with the exception that the first polymerization vessel 8 alone was employed as a single polymerization vessel and that the reaction mixture from the vessel 8 was passed by the pump 52 directly to the devolatilizing extruder 40. The polymerization temperature was 150°C and, the flow rate of the monomer was 23 l/hr.

In Example 16, a monomer feed employed at the steady state consisted of 100 parts of methyl methacrylate, 0.0017 part (i.e. $0.116 \times 10^{-4}$ mol/100 g of the monomer) of di-t-butyl peroxide and 0.29 part of t-butyl mercaptan. The reaction mixture in the vessel 8 was thoroughly stirred and kept to contain 53% of polymer.

In Example 17, a monomer feed at the steady state was a mixture of 100 parts of methyl methacrylate, 0.0014 part (i.e. $0.095 \times 10^{-4}$ mol/100 g of the monomer) of di-t-butyl peroxide and 0.30 part of t-butyl mercaptan. The conversion was kept 55%.

In Example 18, a monomer feed contained 90 parts of methyl methacrylate, 10 parts of methyl acrylate, 0.0014 part (i.e. $0.094 \times 10^{-4}$ mol/100 g of the monomer) of di-t-butyl peroxide and 0.36 part of t-butyl mercaptan at the steady state. The polymer content of the reaction mixture was 65%.

In each example, a continued operation for a week produced satisfactory products having an average polymerization degree of about 1,000. Certain properties of the products are given in Table III below.

Table III

| Example No. | FR | Heat distortion temperature (°C) | $T_2$ (°C) |
| --- | --- | --- | --- |
| 16 | 5.5 – 6.1 | 100 – 104 | 295 – 300 |
| 17 | 5.3 – 6.2 | 100 – 102 | 295 – 305 |
| 18 | 23 – 28 | 87 – 95 | 295 – 300 |

EXAMPLES 19 – 24

In each of these examples, the procedure was repeated as in Example 14 with the exceptions indicated.

The exceptional conditions and the results so obtained are listed in Table IV below.

Table IV

| Example No. | MMA (parts) | Comonomer (parts) | | Mercaptan (parts) | | Stearyl alcohol (wt.% polymer) | | $\bar{P}$*1 | Properties of polymer | | |
| --- | --- | --- | --- | --- | --- | --- | --- | --- | --- | --- | --- |
| | | | | | | | | | FR | HDT*2 (°C) | $T_2$ (°C) |
| 19 | 93.8 | EA*3 | 6.2 | TBM*6 | 0.32 | 0.3 | Ca | 1,000 | 26 – 28 | 89 – 92 | 295 – 300 |
| 20 | 93.8 | " | 6.2 | " | 0.40 | 0.6 | Ca | 800 | 60 – 67 | 79 – 82 | 295 – 300 |
| 21 | 92.1 | BA*4 | 7.9 | " | 0.40 | 0.1 | Ca | 800 | 30 – 34 | 84 – 86 | 295 – 300 |
| 22 | 94.5 | MA*5 | 5.5 | DM*7 | 0.26 | 0.1 | Ca | 1,200 | 6.8–7.4 | 94 – 96 | 295 – 300 |
| 23 | 94.5 | " | 5.5 | BM*8 | 0.08 | 0.1 | Ca | 1,200 | 7.2–7.7 | 95 – 96 | 295 – 300 |
| 24 | 94.5 | " | 5.5 | OM*9 | 0.21 | 0.1 | Ca | 1,200 | 7.0– 7.5 | 94 – 97 | 295 – 300 |

*1 $\bar{P}$: Average polymerization degree of polymer
*2 HDT: Heat distortion temperature
*3 EA: Ethyl acrylate
*4 BA: Butyl acrylate
*5 MA: Methyl acrylate
*6 TBM: tert.-butyl mercaptan
*7 DM: n-dodecyl mercaptan
*8 BM: n-butyl mercaptan
*9 OM: n-octyl mercaptan Comparative Example 1

Following the general procedure described in Example 1, a monomer feed essentially consisting of 100 parts of methyl methacrylate, 0.31 part of tert.-butyl mercaptan and 0.1 part of di-tert.-butyl peroxide having a full life of 2.4 hour at 140°C (i.e. $6.85 \times 10^{-4}$ mol of the initiator/100 g of the monomer feed) was processed except that a polymerization temperature of 140°C and a conversion of 30% were employed. Temperatures of a vent portion, an extruding portion and a die of the employed vent extruder were 275°, 245° and 235°C, respectively.

The molding material so obtained had an FR value of 6 to 8, a heat distortion temperature of 96° to 99°C and $T_2$ of 270°C. After 6 hours continuous operation, adhesion of polymer to parts of the employed apparatus occurred to some extent.

Comparative Example 2

Using a twin-screw extruder (having two screws with the axes aparted 3 inches, each screw having a diameter of 3.5 inches and a length of 49 inches) as a polymerization apparatus, a monomer feed containing 100 parts of methyl methacrylate, 0.225 part of di-t-butyl peroxide having a half life of 0.49 hour at 157°C (i.e. $15.4 \times 10^{-4}$ mol of the initiator/100 g of the monomer feed) and 0.35 part of lauryl mercaptan was continuously polymerized. The monomer feed was supplied to a hopper of the extruder at a rate of 82 g/min, and the reaction mixture discharged from the extruder was continuously passed to a devolatilizor. The temperature in the extruder was 157°C, the residence time in the extruder 25 minutes, and the conversion at the time when extruded 93%. The temperature of the devolatilizor was 260°C. The Polymer discharged from the devolatilizor was cooled and pelletized. The percent residual of methyl methacrylate in the pellets was as high as 1.4% by weight. It is believed that at least part of this high percent residual of methyl methacrylate should be attributed to a thermal decomposition of the polymer in the devolatilizor.

The pellets had $T_2$ of 245°C to 255+C, as measured by the injection molding test, indicating that the moldability was unsatisfactory.

What is claimed is:

1. A process for the production of methacrylate polymer molding materials, said methacrylate polymer containing at least 80% by weight of methyl methacrylate units and up to 20% by weight of units derived from a member of the group consisting of alkyl acrylates and alkyl methacrylates other than methyl methacrylate, by continuous bulk polymerization and subsequent removal of volatile contents, said process comprising:

continuously feeding to a polymerization zone a monomer feed containing 0.01 to 1.0% by mol of mercaptan and a free radical initiator in a concentration such that the following relations are satisfied:

$$10 \geq A^{1/2} \cdot B^{-1/2} \times 10^3,$$

$$3 \geq A \cdot B \times 10^5,$$

and $$2.9 \geq A^{-1}(B + 10.3) \times 10^{-6}$$

where $A$ = concentration of the free radical initiator in the monomer feed in terms of the number of moles of the initiator per 100 g of the monomer feed, and $B$ = half-life in hour of the free radical initiator at a temperature of polymerization;

thoroughly stirring the resultant reaction mixture;

maintaining the reaction mixture at a temperature of above 130° and 160°C;

maintaining a polymer content in said reaction mixture substantially constant and so as to satisfy the following relation:

$$50 < \phi < 70 \exp(0.0121T - 1.81)$$

where $\phi$ = the polymer content in said reaction mixture in % by weight, and $T$ = polymerization temperature in °C, whereby polymerization is effected:

continuously withdrawing the reaction mixture from the polymerization zone and continuously removing volatile contents of said withdrawn reaction mixture.

2. A process for the production of methacrylate polymer molding materials in accordance with claim 1, wherein the reaction mixture in the polymerization zone is kept at a temperature of above 140°C and below 160°C.

3. A process for the production of methacrylate polymer molding materials in accordance with claim 1, wherein said monomer feed essentially consists of methyl methacrylate; an alkyl acrylate selected from the group consisting of methyl, ethyl and butyl acrylates; tert.-butyl mercaptan and di-tert.-butyl peroxide.

4. The process of claim 1 wherein the polymerization zone comprises a single reactor.

5. A process for the production of methacrylate polymer molding materials in accordance with claim 4, wherein the reaction mixture in the polymerization zone is kept at a temperature of above 140° and below 160°C.

6. A process for the production of methacrylate polymer molding materials in accordance with claim 4, wherein said monomer feed essentially consists of methyl methacrylate; an alkyl acrylate selected from the group consisting of methyl, ethyl and butyl acrylates; tert.-butyl mercaptan and di-tert.-butyl peroxide.

7. A process for the production of methacrylate polymer molding materials, said methacrylate polymer containing at least 80% by weight of methyl methacrylate units and up to 20% by weight of units derived from a member of the group consisting of alkyl acrylates and alkyl methacrylates other than methyl methacrylate, by continuous bulk polymerization and subsequent removal of volatile contents, said process comprising:

continuously feeding to a polymerization zone comprising a single reactor a monomer feed containing 0.01 to 1.0% by mol of a mercaptan and a free radical initiator in a concentration such that the following relations are satisfied:

$$6 \geq A^{1/2} \cdot B^{-1/2} \times 10^3,$$

$$2.5 \geq A \cdot B \times 10^5,$$

and $$2 \geq A^{-1}(B + 10.3) \times 10^{-6}$$

where $A$ = concentration of the free radical initiator in the monomer feed in terms of the number of moles of the initiator per 100 g of the monomer feed, and $B$ = half-life in hour of the free radical initiator at a temperature of polymerization;

thoroughly stirring the resultant reaction mixture;

maintaining the reaction mixture at a temperature of above 140°C and below 160°C;

maintaining a polymer content in said reaction mixture substantially constant and so as to satisfy the following relation:

$$50 < \phi < 70 \exp(0.0121T - 1.81)$$

where $\phi$ = the polymer content in said reaction mixture in % by weight, and $T$ = polymerization temperature in °C, whereby polymerization is effected;

continuously withdrawing the reaction mixture from the polymerization zone and continuously removing volatile contents of said withdrawn reaction mixture.

* * * * *